US011864137B2

(12) United States Patent
Szemes et al.

(10) Patent No.: US 11,864,137 B2
(45) Date of Patent: Jan. 2, 2024

(54) APPARATUS AND METHOD FOR SYNCHRONIZING END NODES

(71) Applicant: KNORR-BREMSE Systeme fuer Nutzfahrzeuge GmbH, Munich (DE)

(72) Inventors: Bence Szemes, Szekszard (HU); Tamas Konya, Paks (HU); Huba Nemeth, Budapest (HU); Alexander Fuchs, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/276,742

(22) PCT Filed: Aug. 27, 2019

(86) PCT No.: PCT/EP2019/072756
§ 371 (c)(1),
(2) Date: Mar. 16, 2021

(87) PCT Pub. No.: WO2020/057899
PCT Pub. Date: Mar. 26, 2020

(65) Prior Publication Data
US 2022/0046569 A1 Feb. 10, 2022

(30) Foreign Application Priority Data
Sep. 17, 2018 (EP) .................................... 18194769

(51) Int. Cl.
H04W 52/02 (2009.01)
H04W 56/00 (2009.01)

(52) U.S. Cl.
CPC ... *H04W 56/0015* (2013.01); *H04W 52/0229* (2013.01); *H04W 56/0025* (2013.01)

(58) Field of Classification Search
CPC ......... H04W 56/0015; H04W 52/0229; H04W 56/0025; H04W 56/001; H04W 84/18;
(Continued)

(56) References Cited

U.S. PATENT DOCUMENTS

| 4,733,561 | A | 3/1988 | Gilby |
| 7,760,109 | B2 * | 7/2010 | Broad .................. G08B 29/188 340/541 |

(Continued)

FOREIGN PATENT DOCUMENTS

| CN | 87 1 05179 A | 2/1988 |
| CN | 103368598 A | 10/2013 |
| CN | 104782073 A | 7/2015 |

OTHER PUBLICATIONS

International Search Report (PCT/ISA/210) issued in PCT Application No. PCT/EP2019/072756 dated Oct. 7, 2019 (four (4) pages).

(Continued)

*Primary Examiner* — Wutchung Chu
(74) *Attorney, Agent, or Firm* — Crowell & Moring LLP

(57) ABSTRACT

An apparatus for synchronizing end nodes in a vehicle has an emitter for emitting a synchronization signal to the end nodes and a receiver for receiving one or more response signals from the end nodes. The synchronization signal is adapted to address a subset or all of the end nodes to enable a synchronized action of the addressed end nodes and/or to trigger a generation of one or more response signals in response to the received synchronization signal.

10 Claims, 2 Drawing Sheets

(58) Field of Classification Search
CPC ....... H04W 4/02; Y02D 30/70; H04L 67/125; H04L 7/0331
See application file for complete search history.

(56) References Cited

U.S. PATENT DOCUMENTS

| | | | | |
|---|---|---|---|---|
| 8,115,593 | B2* | 2/2012 | Broad | G08B 25/009 |
| | | | | 370/252 |
| 9,537,956 | B1* | 1/2017 | Sibenac | H04W 56/001 |
| 10,531,075 | B1* | 1/2020 | Dariush | H04N 13/296 |
| 10,820,292 | B1* | 10/2020 | Peter | H04W 4/46 |
| 11,023,742 | B2* | 6/2021 | Han | G06V 20/56 |
| 2005/0066101 | A1* | 3/2005 | Fuehrer | G06F 3/0481 |
| | | | | 710/300 |
| 2009/0190571 | A1* | 7/2009 | Kitz | H04Q 9/00 |
| | | | | 370/350 |
| 2010/0183016 | A1* | 7/2010 | Bonk | G05D 1/0077 |
| | | | | 709/248 |
| 2011/0304454 | A1 | 12/2011 | Lickfelt et al. | |
| 2012/0140861 | A1* | 6/2012 | Menon | B60T 7/18 |
| | | | | 375/356 |
| 2013/0260820 | A1 | 10/2013 | Schmandt et al. | |
| 2014/0379165 | A1 | 12/2014 | Weiss | |
| 2015/0039865 | A1* | 2/2015 | Ishigooka | G06F 9/30032 |
| | | | | 712/221 |
| 2015/0256249 | A1 | 9/2015 | Doetsch et al. | |
| 2015/0310677 | A1* | 10/2015 | Shin | G07C 5/0808 |
| | | | | 701/29.1 |
| 2016/0020863 | A1* | 1/2016 | Kim | G07C 5/006 |
| | | | | 701/32.7 |
| 2016/0352388 | A1* | 12/2016 | Lane | H04B 1/3822 |
| 2016/0366065 | A1 | 12/2016 | Kazanchian et al. | |
| 2017/0078989 | A1 | 3/2017 | Kravets et al. | |
| 2017/0101077 | A1* | 4/2017 | Wisnia | B60R 25/24 |
| 2017/0238270 | A1* | 8/2017 | Shen | H04W 56/001 |
| | | | | 370/336 |
| 2017/0244477 | A1* | 8/2017 | Seo | H04L 12/40 |
| 2017/0307036 | A1 | 10/2017 | Nuesser et al. | |
| 2018/0072113 | A1 | 3/2018 | Baker | |
| 2018/0182182 | A1* | 6/2018 | Meyer | G07C 5/008 |
| 2020/0241130 | A1* | 7/2020 | Lewandowski | H04L 12/40013 |
| 2020/0371519 | A1* | 11/2020 | Pfeil | H04W 4/46 |
| 2021/0006435 | A1* | 1/2021 | Iwata | H04L 12/40169 |
| 2021/0076203 | A1* | 3/2021 | Sakamoto | H04Q 9/00 |
| 2021/0082205 | A1* | 3/2021 | Terao | G08G 1/143 |
| 2021/0109564 | A1* | 4/2021 | Hirotsu | G06F 1/04 |
| 2021/0162821 | A1* | 6/2021 | Huard | B60C 23/0479 |
| 2022/0123850 | A1* | 4/2022 | Adrian | H04J 3/0697 |
| 2023/0171014 | A1* | 6/2023 | Patel | H04W 72/23 |
| | | | | 370/503 |

OTHER PUBLICATIONS

Written Opinion (PCT/ISA/237) issued in PCT Application No. PCT/EP2019/072756 dated Oct. 7, 2019 (six (6) pages).
Extended European Search Report issued in European Application No. 18194769.8 dated Mar. 19, 2019 (nine (9) pages).
European Office Action issued in European Application No. 18 194 769.8 dated Jul. 30, 2021 (five (5) pages).
Chinese-language Office Action issued in Chinese Application No. 201980060475.0 dated Apr. 25, 2023 with partial English translation (8 pages).

* cited by examiner

APPARATUS AND METHOD FOR SYNCHRONIZING END NODES

BACKGROUND AND SUMMARY OF THE INVENTION

The present invention relates to an apparatus and a method for synchronizing end nodes and, in particular, to a synchronization of actions of sensors and actuators within a vehicle, in particular in commercial vehicles.

Wireless end nodes such as sensors and actuators are getting more and more widespread in automotive applications such as commercial vehicles. For example, by replacing existing wire connections with wireless solutions an easier integration of various components is made possible.

The replacement of wired by wireless solutions implies in many cases that the power supply has to be replaced too. However, the increasing energy consumption becomes a major issue, in particular for electric vehicle. Same applies to other forms of energy harvesting, which often have only a very limited performance. Hence, the available energy should be saved wherever possible. A sensor node, for example, needs valuable energy when taking measurements and transmitting the results. To reduce the energy consumption, the transmission of data should be done only if really needed. This can be realized by placing the sensor nodes in standby modus, wherein they consume only very little energy.

As long as the events to be measured are synchronous, the sensor nodes can act accordingly. However, if a sensor, for example, has to monitor an asynchronous signal (e.g. measure a random action) or if an actuator has to actuate in a non-predictable manner, the synchronization becomes a major issue when the end nodes shall still consume as little energy as possible.

In US 2018/072113 A1 a wireless data acquisition system is disclosed that monitors a wheel of a vehicle and sends data wirelessly to a base station. However, here no synchronization is needed, because the wheel can be monitored independently of other end nodes. US 2017/307036 discloses another known wireless data acquisition system for a brake system that also sends data wirelessly to a base station. Also here, the sensor signals are generated independently of other sensors so that the above-mentioned synchronization issue does not occur. US 2017/101077 A1 discloses a keyless entry system for vehicles that uses a communication interface to communicate between the vehicle and the key. However, in this application only a single connection between two components is needed, so that the synchronization issue does not occur.

Therefore, there is a demand for an architecture that allows the end nodes to stay at a lower power state for as long as possible, but still allows a synchronization of a plurality of end nodes to perform particular actions.

At least some of these problems of conventional devices are overcome by an apparatus, a system and a method, according to the independent claims. The dependent claims refer to further advantageous realizations of the subject matter of the independent claims.

Embodiments of the present invention relates to an apparatus for synchronizing end nodes in a vehicle (especially in or on commercial vehicles). The apparatus comprises an emitter for emitting a synchronization signal to the end nodes and a receiver for receiving one or more response signals from the end nodes. The synchronization signal is adapted to address a subset (i.e. at least one) or all of the end nodes to enable a synchronized action of the addressed end nodes and/or to trigger a generation of the one or more response signals in response to the received synchronization signal.

The end nodes may include at least one sensor node and/or at least one actuator. Optionally the apparatus includes a processing unit, which is configured to provide a same or different synchronization signals to trigger one or more actuations by the actuator(s) and/or to trigger a generation of one or more sensor signals by the sensor node(s) as response signals. Optionally, the processing unit is adapted to evaluate the actuation of the actuator(s) based on the received response signal(s) from the sensor node(s).

Optionally, the emitter is adapted to emit different synchronization signals for triggering different actions at the end nodes. For example, the emitter may be configured to emit the synchronization signal(s) with a frequency of less than 1 MHz, in particular of 125 kHz (or in a frequency band around it). Likewise, the receiver may be configured to receive the one or more response signals with a frequency of more than 100 MHz, in particular of a frequency band of or around 433 MHz or of 2.4 GHz.

Embodiments of the invention relates also to a system with a plurality of end nodes and an apparatus as defined before. The end nodes of the system may comprise: one or more sensor nodes being configured to provide one or more sensor signals in response to the synchronization signal(s). The end nodes of the system may likewise include one or more actuators being configured to perform an actuation in response to the synchronization signal.

Optionally, the end nodes are adapted to provide the one or more response signals as raw or processed measured data. Moreover, the end nodes may be configured to schedule the transmission of the one or more response signals (e.g. an immediate transmission or a delayed transmission, perhaps depending on the synchronization signal). Furthermore, the end nodes may be controllable by different synchronization signals to trigger different actions of the end nodes. The end nodes may be configured to be in a standby mode with a decreased energy consumption and to wake-up upon receiving the synchronization signal. Optionally, the end nodes are battery operated devices.

Embodiments relate also to a method for synchronizing end nodes on a vehicle. The method comprises a step of emitting a synchronization signal to the end nodes and a step of receiving one or more response signals from the end nodes. The synchronization signal is adapted to address a subset or all of the end nodes to enable a synchronized action of the addressed end nodes and/or to trigger a generation one or more response signals in response to the received synchronization signal.

This method or part thereof may also be implemented in software or a computer program product and the order of steps may not be important to achieve the desired effect. Embodiments of the present invention can, in particular, be implemented by software or a software module in an ECU (electronic control unit). Therefore, embodiment relate also to a computer program having a program code for performing the method, when the computer program is executed on a processor.

Embodiments of the present invention relate therefore to an intra-vehicle communication system between end nodes and a central unit. The central unit may for example be a receiver for receiving sensor signals from a plurality of sensor nodes which may be arranged at different positions in the vehicle. By using a low-power trigger source for sending the synchronization signal, embodiments are able to synchronize various actions at the end nodes to asynchronous events. The asynchronous events may, for example, relate to braking actions or steering actions or an opener of a door which are not foreseeable by the sensor nodes.

Some examples of the systems and/or methods will be described in the following by way of examples only, and with respect to the accompanying figures.

DETAILED DESCRIPTION OF THE DRAWINGS

Figure 1:
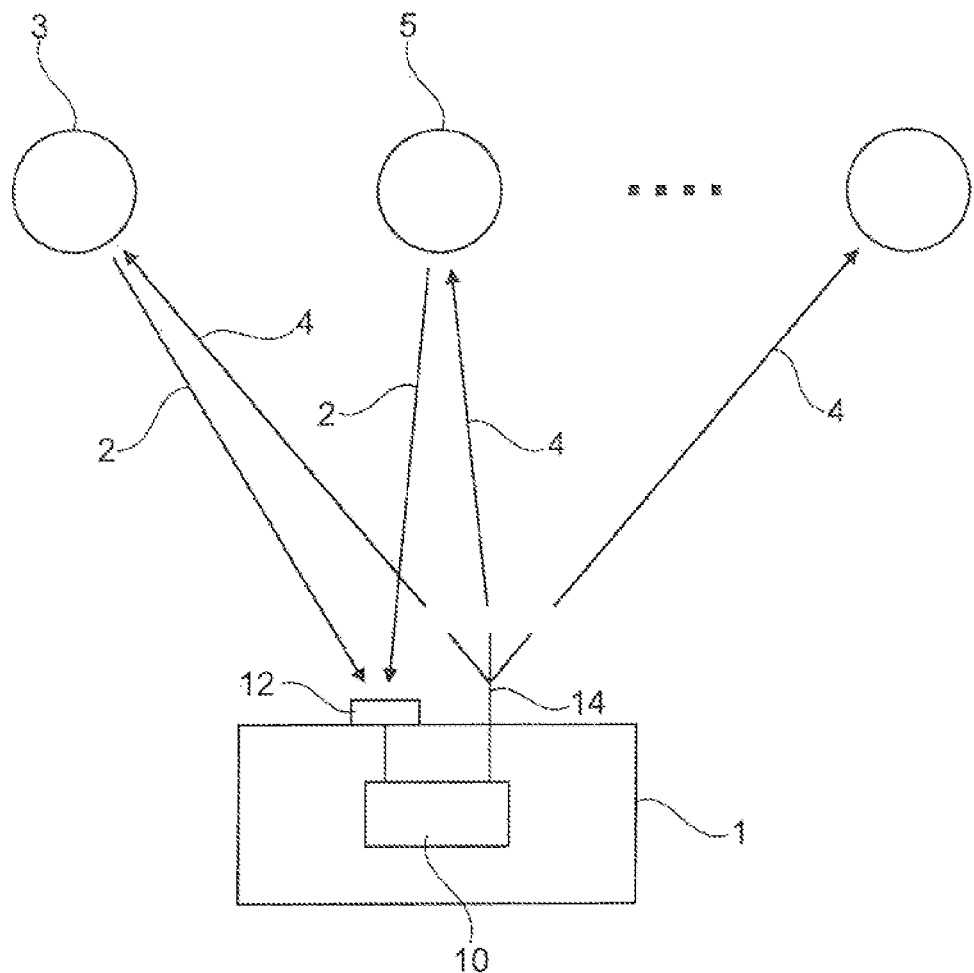
FIG. 1 depicts an architecture with an apparatus for synchronizing end nodes in a vehicle according to an embodiment of the present invention.

FIG. 1 depicts an apparatus 1 for synchronizing end nodes 3, 5 in a vehicle. The apparatus 1 comprises an emitter 14 for emitting a synchronization signal 4 to the end nodes 3, 5 and a receiver 12 for receiving one or more response signals 2 from the end nodes 3, 5. The synchronization signal 4 is adapted to address a subset or all of the end nodes 3, 5 to enable a synchronized action of the addressed end nodes 3, 5 and/or to trigger a generation of one or more response signals 2 in response to the received synchronization signal 4. The end nodes 3, 5 may be part of a sensor network distributed in the vehicle that are controlled by the apparatus using the synchronization signals 4.

Figure 2:
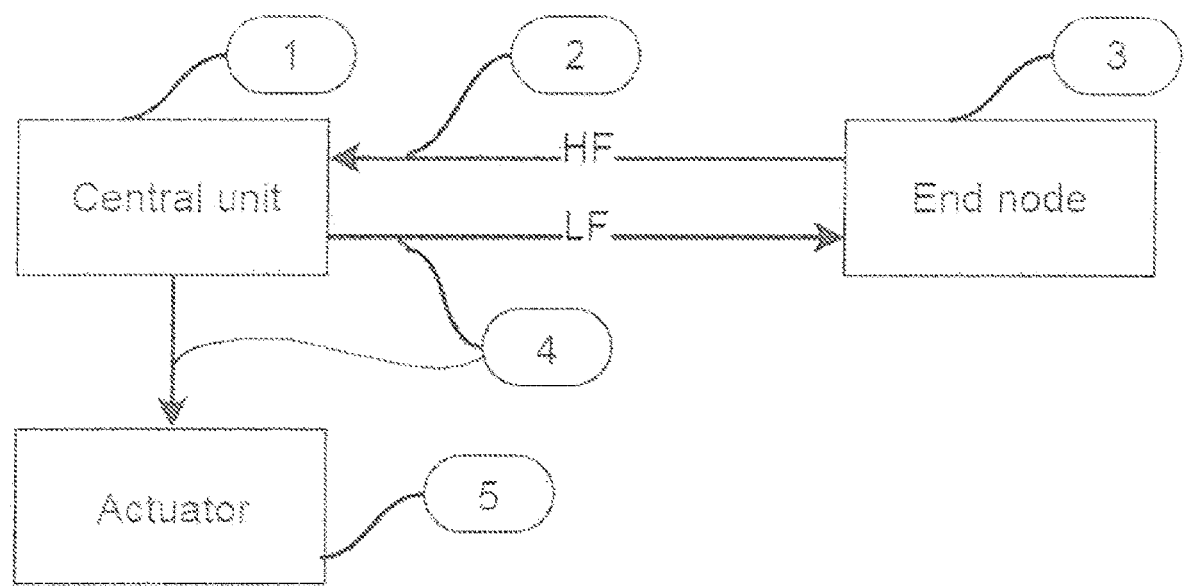
FIG. 2 depicts a system with an actuator and an additional end node according to another embodiment of the present invention.

FIG. 2 depicts a system according to another embodiment of the present invention, wherein one end node 5 is an actuator that provides at least one particular action in the vehicle. This actuator 5 may be controlled based on a same synchronization signal 4 as the other end nodes 3 (e.g. sensors) or by a different, actuator-specific synchronization signal. The actuator-specific signal 4 may be adapted to trigger different actions (e.g. by using a different code). The apparatus 1 acts here as central unit for controlling different kinds of end nodes 3, 5 providing an intra-vehicle communication system.

The central unit 1 may comprise a processing unit 10 for generating the synchronization signal(s) 4 and for processing and evaluating the received response signal(s) 2.

For example, the receiver 12 may receive signals from a plurality of sensor nodes 3, which may be arranged at different positions in the vehicle.

In the embodiment depicted in FIG. 2, the central unit 1 prompts the actuator 5 for a particular action. Its effect is measured by one of the end nodes 3. Particular actions may be one or more of the following:
  a braking action,
  a steering,
  clutch or gear shifting,
  door opener, or
  any other kind of movement not foreseeable by the sensor nodes and which is to be measured by a sensor so as to ensure the correct actuation.

Hence, the central unit 1 sends a synchronization signal 4 that triggers the actuator to perform the actuation and at the same time prompts at least one sensor to perform a measurement to judge the success of the actuation (with a possible delay therebetween). The synchronization signal 4 prompts thus the end nodes 3 to take these measurements. Optionally, the central unit 1 may also send different signals 4 to the actuator 5 and the sensor node 3. This is of particular advantage if there is some delay is to be expected between the start and end of the actuation.

In further advantageous embodiment, the central unit 1 uses a low-frequency communication signal for the synchronization signal 4 such as directional radio signals with a frequency of about 125 kHz. This has the advantage that end nodes 3, 5 do not need constantly operating high frequency receivers (to hear for a synchronization signal), which consume significant amount of energy. Instead, a low-power trigger source can be used to synchronize various actions at the end nodes 3, 5 to asynchronous events. On the other hand, the response signal(s) 2 may be a high frequency signal (e.g. more than 1 MHz) to enable a sufficient data transmission rate. For example, the frequency may be around 433 MHz or about 2.4 GHz (using e.g. Bluetooth or WiFi or some other standard). Therefore, the response signal(s) 2 may be transmitted over a high-frequency wireless communication as a directional signal, where the end node 3 is a transmitter and the central unit 1 is a receiver.

A particular advantage of embodiments of the present invention relates to the achievable energy efficiency which is made possible by allowing the end nodes 3, 5 to be in standby modus whenever possible and using the synchronization signal 2 to wake up the end nodes 3, 5 only for the moment when the action (actuation or sensing) is needed. Thereafter, the end nodes 3, 5 may again fall back in the standby modus to allow a minimized energy consumption. Therefore, embodiments are particularly suitable for end nodes 3, 5 that rely on battery-power (e.g. battery-powered sensors) or use an energy harvesting of limited efficiency.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS 1 apparatus
2 response signal(s)
3 sensor end nodes
4 synchronization signal
5 actuator end nodes
10 processing unit
12 receiver
14 emitter

The invention claimed is:

1. A system comprising:
  a plurality of end nodes, wherein
    the end nodes include a sensor node and an actuator; and
  an apparatus for synchronizing the plurality of end nodes in a vehicle, the apparatus comprising:
    an emitter for emitting a synchronization signal to the end nodes;
    a receiver for receiving one or more response signals from the end nodes; and
    a processor configured to provide the synchronization signal via the emitter, wherein the actuator is configured to perform an actuation triggered by reception of the synchronization signal, and the sensor node is configured to generate a sensor signal prompted by reception of the synchronization signal, wherein the synchronization signal is configured to address a subset or all of the end nodes to:

enable a synchronized action of the addressed end nodes, and trigger a generation of one or more response signals from the end nodes in response to the emitted synchronization signal; and the end nodes are configured to be in a standby mode with a decreased energy consumption and to wake up upon receiving the synchronization signal.

2. The system according to claim 1, wherein the processor is configured to evaluate the actuation of the actuator based on the received response signal from the sensor node.

3. The system according to claim 1, wherein the emitter is configured to emit different synchronization signals for triggering different actions at the end nodes.

4. The system according to claim 1, wherein the emitter is configured to emit the synchronization signal with a frequency of less than 1 MHz, and the receiver is configured to receive the one or more response signals with a frequency of more than 100 MHz.

5. The system according to claim 1, wherein the emitter is configured to emit the synchronization signal with a frequency of 125 kHz, and the receiver is configured to receive the one or more response signals with a frequency band of 433 MHz or of 2.4 GHz.

6. The system according to claim 1, wherein the end nodes are configured to provide the one or more response signals as raw or processed measured data and/or to schedule the one or more response signals.

7. The system according to claim 1, wherein the end nodes are controllable by different synchronization signals to trigger different actions of the end nodes.

8. The system according to claim 1, wherein the end nodes are battery-powered devices.

9. A method for synchronizing a plurality of end nodes on a vehicle, comprising:

emitting a synchronization signal to the end nodes, wherein the end nodes include a sensor node and an actuator;

receiving one or more response signals from the end nodes;

performing an actuation triggered by reception of the synchronization signal;

generating a sensor signal prompted by reception of the synchronization signal;

the synchronization signal is further configured to address a subset or all of the end nodes to:

enable a synchronized action of the addressed end nodes, and trigger a generation of one or more response signals from the sensor node of the end nodes in response to the emitted synchronization signal; and evaluating the actuation of the actuator based on the received response signal from the sensor node, wherein the end nodes are configured to be in a standby mode with a decreased energy consumption and to wake up upon receiving the synchronization signal.

10. A computer product comprising a non-volatile memory having stored thereon program code that, when executed by a processor or a control unit, configures the processor to carry out the acts of:

emitting a synchronization signal to a plurality of end nodes, wherein the end nodes include a sensor node and an actuator; and receiving one or more response signals from the end nodes, performing an actuation triggered by reception of the synchronization signal, generating a sensor signal prompted by reception of the synchronization signal, wherein the synchronization signal is further configured to address a subset or all of the end nodes to:

enable a synchronized action of the addressed end nodes, and/or trigger a generation of one or more response signals from the sensor node of the end nodes in response to the emitted synchronization signal; and evaluating the actuation of the actuator based on the received response signal from the sensor node, wherein the end nodes are configured to be in a standby mode with a decreased energy consumption and to wake up upon receiving the synchronization signal.

* * * * *